(12) United States Patent
O'Dea

(10) Patent No.: US 6,483,882 B1
(45) Date of Patent: Nov. 19, 2002

(54) EFM DEMODULATION CIRCUIT AND METHOD

(76) Inventor: James Orrin O'Dea, 352 Calle Burro, San Clemente, CA (US) 92673

( * ) Notice: Subject to any disclaimer, the term of this patent is extended or adjusted under 35 U.S.C. 154(b) by 0 days.

(21) Appl. No.: 09/317,451

(22) Filed: May 24, 1999

(51) Int. Cl.[7] .............................. H03D 1/00; H04L 27/06
(52) U.S. Cl. ........................ 375/343; 375/340; 714/758; 714/759
(58) Field of Search ............................ 375/340, 343; 341/59, 58, 68, 69; 360/26; 365/185.09, 230.06, 230.07; 369/59.25, 53.18, 53.35; 714/752, 758, 759, 768, 769

(56) References Cited

U.S. PATENT DOCUMENTS

| | | | | |
|---|---|---|---|---|
| 4,398,224 A | * | 8/1983 | Watanabe | 386/91 |
| 4,932,018 A | * | 6/1990 | Nagasawa et al. | 369/59 |
| 5,596,558 A | * | 1/1997 | Arataki et al. | 369/53 |
| 6,043,764 A | * | 3/2000 | Sannino et al. | 341/59 |
| 6,195,778 B1 | * | 2/2001 | Tran | 714/752 |
| 6,345,374 B1 | * | 2/2002 | Tsuda | 714/746 |
| 6,378,103 B1 | * | 4/2002 | Han | 714/769 |

* cited by examiner

Primary Examiner—Phuong Phu
(74) Attorney, Agent, or Firm—Leonard Tachner

(57) ABSTRACT

A method for EFM demodulation is provided which includes a fuzzy logic-based ROM look-up conversion table capable of correcting data errors caused by invalid EFM bit patterns. The ROM look-up table contains the conversion data of valid EFM 14-channel bit patterns to 8-bit digital values. In addition to the valid pattern conversion, the ROM look-up table also includes fuzzy logic-based conversion of all invalid EFM 14-channel bit patterns to 8-bit digital values. The conversion of invalid EFM 14-channel bit patterns to 8-bit digital values allows error correction to begin during EFM demodulation using the inventive method. The invention improves the depth of the overall error correction system by correcting many of the data errors caused by invalid 14-channel bit patterns and most of the simple "off by one clock period" invalid patterns.

43 Claims, 8 Drawing Sheets

SINGLE BIT COMPARE TESTS   CHANNEL BIT POSITION 13 12 11 10 9 8 7 6 5 4 3 2 1 0

VALID EFM PATTERN     0 0 0 0 0 0 0 0 1 0 0 1 0 0
INVALID EFM PATTERN   0 0 0 0 0 0 0 0 1 0 0 1 0 0
ADD 30 POINTS FOR EACH BIT POSITION THAT COMPARE       = 360 POINTS

VALID EFM PATTERN     0 0 0 0 1 0 0 0 1 0 0 1 0 0
INVALID EFM PATTERN   0 0 0 0 1 0 0 0 0 1 0 1 0 0
SUBTRACT 5 POINTS FOR EACH BIT POSITION THAT DOES NOT COMPARE   = -10 POINTS

VALID EFM PATTERN     0 0 0 0 1 0 0 0 1 0 0 1 0 0
INVALID EFM PATTERN   0 0 0 0 0 1 0 0 1 0 0 1 0 0
ADD 4 POINTS IF BOTH PATTERNS HAVE SAME NUMBER OF ONES   = 4 POINTS

VALID EFM PATTERN     0 0 0 1 0 0 0 0 1 0 0 1 0 0
INVALID EFM PATTERN   0 0 0 1 0 0 0 0 1 0 0 1 0 0
ADD ONE POINT FOR EACH BIT THAT COMPARES IN LONGEST RUN   = 10 POINTS

FIG. 4

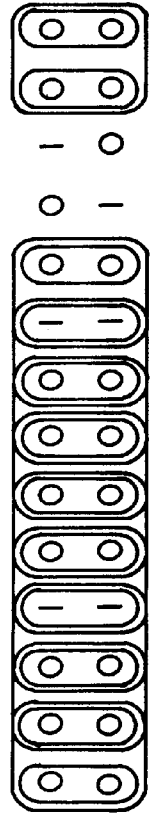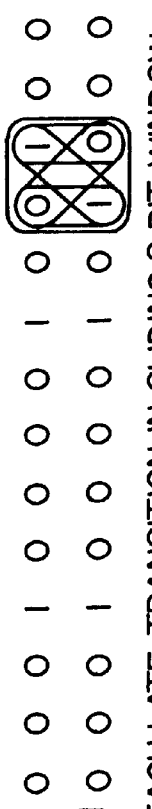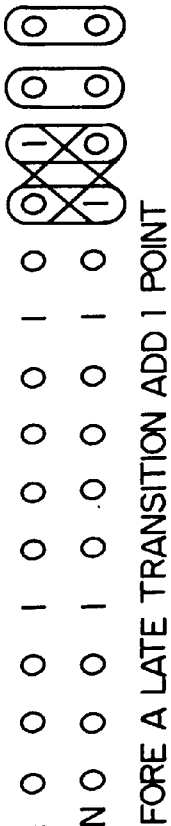
FIG. 5

TRIPLE BIT COMPARE TESTS    CHANNEL BIT POSITION 13 12 11 10 9 8 7 6 5 4 3 2 1 0

| | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|
| VALID EFM PATTERN | 0 | 0 | 0 | 0 | 0 | 0 | 0 | 0 | 1 | 0 | 0 | 1 | 0 | 0 | = 80 POINTS |
| INVALID EFM PATTERN | 0 | 0 | 0 | 0 | 0 | 0 | 0 | 0 | 1 | 0 | 0 | 1 | 0 | 0 | |

ADD 10 POINTS FOR EACH THREE BITS IN A ROW THAT COMPARE IN SLIDING 3 BIT WINDOW

| VALID EFM PATTERN | 0 | 0 | 0 | 0 | 0 | 0 | 0 | 0 | 1 | 0 | 0 | 1 | 0 | 0 | = 40 POINTS |
|---|---|---|---|---|---|---|---|---|---|---|---|---|---|---|---|
| INVALID EFM PATTERN | 0 | 0 | 0 | 0 | 0 | 0 | 0 | 1 | 0 | 0 | 1 | 0 | 0 | 0 | |

ADD 20 POINTS FOR EACH LATE TRANSITION IN SLIDING 3 BIT WINDOW

| VALID EFM PATTERN | 0 | 0 | 0 | 0 | 0 | 0 | 0 | 0 | 1 | 0 | 0 | 1 | 0 | 0 | = 0 POINTS |
|---|---|---|---|---|---|---|---|---|---|---|---|---|---|---|---|
| INVALID EFM PATTERN | 0 | 0 | 0 | 0 | 0 | 0 | 1 | 0 | 0 | 1 | 0 | 0 | 0 | 0 | |

ADD 15 POINTS FOR EACH EARLY TRANSITION IN SLIDING 3 BIT WINDOW

FIG. 6

QUAD BIT COMPARE TESTS

CHANNEL BIT POSITION
13 12 11 10 9 8 7 6 5 4 3 2 1 0

| | |
|---|---|
| VALID EFM PATTERN   0 0 0 1 0 0 0 0 1 0 0 1 0 0<br>INVALID EFM PATTERN 0 0 0 1 0 0 0 0 1 0 1 0 0 0<br>ADD 10 POINTS FOR EACH FOUR BITS EQUAL IN A ROW | = 70 POINTS |
| VALID EFM PATTERN   0 0 0 1 0 0 0 0 1 0 0 1 0 0<br>INVALID EFM PATTERN 0 0 0 1 0 0 0 0 1 0 1 0 0 0<br>ADD 15 POINTS FOR EACH LATE TRANSITION AT EDGE OF 4 BIT SLIDING WINDOW | = 30 POINTS |
| VALID EFM PATTERN   0 0 0 1 0 0 0 0 1 0 0 1 0 0<br>INVALID EFM PATTERN 0 0 0 1 0 0 0 0 1 0 1 0 0 0<br>ADD 15 POINTS FOR EACH EARLY TRANSITION AT EDGE OF 4 BIT SLIDING WINDOW | = 0 POINTS |
| VALID EFM PATTERN   0 0 0 1 0 0 0 0 1 0 0 1 0 0<br>INVALID EFM PATTERN 0 0 0 1 0 0 0 0 1 0 1 0 0 0<br>ADD 20 POINTS FOR EACH LATE TRANSITION IN CENTER OF SLIDING 4 BIT WINDOW | = 20 POINTS |
| VALID EFM PATTERN   0 0 0 1 0 0 0 0 1 0 0 1 0 0<br>INVALID EFM PATTERN 0 0 0 1 0 0 0 0 1 0 1 0 0 0<br>ADD 20 POINTS FOR EACH EARLY TRANSITION IN CENTER OF SLIDING 4 BIT WINDOW | = 0 POINTS |
| VALID EFM PATTERN   0 0 0 1 0 0 0 0 1 0 0 1 0 0<br>INVALID EFM PATTERN 0 0 0 1 0 0 0 0 1 0 1 0 0 0<br>ADD 40 POINTS FOR EACH 2T LOCATED WITHIN A 3T IN A SLIDING 4 BIT WINDOW | = 40 POINTS |

FIG. 7

EFM DEMODULATION CIRCUIT AND METHOD

BACKGROUND OF THE INVENTION

1. Field of the Invention

The present invention relates generally to a circuit and method for EFM demodulation, and more specifically, to a circuit and method capable of correcting data errors caused by invalid EFM bit patterns during demodulation by using a|conversion table, based on fuzzy logic.

2. Prior Art

Data is stored on a compact disc as a single spiral of pits and lands. The data is encoded as eight-to-fourteen modulation or EFM. EFM is an encoding technique where 8-bit digital values are converted into 14-channel bit symbols. The basic block diagram of all compact disc players includes an EFM demodulation stage. The EFM demodulation stage can be implemented using a ROM look-up table or a logic array.

The standard EFM conversion table defines the conversion of 8 bit digital to 14-channel bit symbols. The assignment of 8-bit digital to 14-channel bit symbols called out by the standard EFM conversion table was done arbitrarily and the 14-channel bit symbols do not follow a specific sequential binary progression. Bit patterns in the standard EFM conversion table were chosen carefully to minimize the number of transitions required to represent the original 8-bit digital data making the compact disc easier to manufacture and to establish a minimum and maximum length of pits and lands. The number of possible patterns for a 14-bit binary number is 16,384 and the number of patterns used to represent EFM is 258 (256 for data and 2 patterns for sub-code synchronization purposes) which leave 16,126 invalid patterns unused and undefined by the standard EFM conversion table.

The compact disc player uses a laser head assembly to read the reflective contrast of pit versus land and convert that contrast into a high frequency wave that is sliced at the zero crossing point into a digital series of ones and zeros. The format of the compact disc defines the data to be grouped into 588-channel bit frames. Each 588-channel bit frame includes a 24-channel bit synchronization pattern; one 14-channel bit sub-code symbol, twenty-four 14-channel bit symbols of data and eight 14-channel bit symbols of error correction code. Three merging bits separate the synchronization pattern and each 14-channel bit symbol. The merging bits are used to maintain the minimum and the maximum pit and land lengths and to minimize the DC content of the signal over time.

The pits on a compact disc are among the smallest structures ever manufactured. A compact disc may have as many as 3 billion pits. Pits of nine separate lengths are used on the compact disc. The pits range in size from the shortest that is 0.833 micrometers to the longest that is 3.05 micrometers in length. All of the pits are approximately 0.5 micrometers wide and approximately 0.11 micrometers deep. It may be easier to visualize just how small the pits on the compact disc are if you consider that a human hair is approximately 75 micrometers in diameter. Precise manufacturing control of the shape, length, width and depth of the pits is required to make a disc playable. Variations in the manufacturing process of compact discs can cause problems such as jitter or variation of pit and land lengths, which may cause data errors during playback. Data errors are common place and error correction circuits are required and can be found in all compact disc players. Traditional error correction on the compact disc player occurs after EFM demodulation (fourteen bit symbols back to 8-bit digital values). Existing compact disc systems do not prevent invalid EFM 14-channel bit patterns from entering the system and creating data errors during translation into 8-bit digital values and rely solely on an elaborate multiple stage error correction scheme for providing error-free data.

Error correction in a compact disc system:carries a format burden of 8 symbols of error correction code for every 24 symbols of user data. This format burden affects both data transfer rate and overall storage capacity of the compact disc. The error correction system is precise and effective, but at the same time is limited in the number of corrections it can make per frame of data before it fails and an entire frame of data is lost. An improvement to the system, which reduces errors, will also reduce the chance that the error correction circuitry will reach its limit and fail. The ideal improvement of the compact disc error correction system would be one that increases the error correction capability without increasing the burden or creating incompatibility.

Fuzzy logic is a form of logic where absolute or one-to-one correspondence is not required to determine the correct or most likely choice. The demodulation of EFM offers an ideal opportunity for the application of fuzzy logic. The patterns selected for EFM tend to be as different as possible from each other. The fact that EFM uses only 258 out of 16,384 patterns leaves many invalid patterns, which are very similar to valid EFM patterns.

The integrity of data in digital systems is of crucial importance. A single uncorrected data error in a software program can cause an entire system to fail. The manufacturers of compact discs and compact disc players go to great lengths to create a system which can deliver error-free data under less than ideal conditions. The consumer's demands for less expensive and faster methods to transfer data from the compact disc continues to drive the industry. Industry's response to this demand has tested the compact disc specification based on a 1× data rate. The original compact disc specification detailed how to build a disc and player for 1× data rate, where present day compact disc drives commonly used in computer systems are now approaching data rates of 50× and beyond.

SUMMARY OF THE INVENTION

Briefly, in accordance with the invention, a method for EFM demodulation is provided which includes a fuzzy logic-based ROM look-up conversion table capable of correcting data errors caused by invalid EFM bit patterns. The ROM look-up table contains the conversion data of valid EFM 14-channel bit patterns to 8-bit digital values. In addition to the valid pattern conversion, the ROM look-up table also includes fuzzy logic-based conversion of all invalid EFM 14-channel bit patterns to 8-bit digital values. The conversion of invalid EFM 14-channel bit patterns to 8-bit digital values allows error correction to begin during EFM demodulation using the inventive method.

Considering that there are 16,384 possible 14-channel bit patterns and EFM uses only 258 of those patterns, it is not surprising that a high percentage of data errors that occur in EFM tend to fall outside of the 258 valid 14-channel bit patterns. All data errors caused by invalid EFM 14-channel bit patterns have a chance of being corrected during conversion back to 8-bit digital values by the invention. The invention is not limited to how many symbols it can correct per frame as the traditional error correction circuitry. The invention improves the depth of the overall error correction system by correcting many of the data errors caused by invalid 14-channel bit patterns and most of the simple "off by one clock period" invalid patterns. The inventive method relies on traditional error correction circuits for the errors that do not show up as invalid patterns or those that it is unable to resolve. If the inventive method is unable to correct an error caused by an invalid EFM 14-channel bit pattern, the attempt to correct the error is transparent to the preceding error detection and correction circuits. The error detecting and correcting circuits detect and correct the error just as if the invalid EFM 14-channel bit pattern has been demodulated by a traditional EFM demodulation circuit.

The inventive method is not limited to compact disc applications, but can be used in other systems such as digital versatile disc (DVD), digital audio tape (DAT) and other systems which use EFM or similar block encoding.

An alternate method and circuit to correct errors caused by invalid EFM 14-channel bit patterns is implemented by adding digital logic gates to the shift register stage of an EFM demodulator. A percentage of errors caused by invalid 14-channel bit patterns can be corrected by converting invalid channel bit patterns detected as 1T and 2T channel bit lengths to valid 3T channel bit lengths using digital logic gates in conjunction with the shift register stage of the EFM demodulator.

The alternate method and circuit will convert some of the invalid 14-channel bit patterns to valid 14-channel bit patterns before the parallel output of the shift register is used as the address to a standard EFM conversion table. Therefore, some errors caused by invalid 14-channel bit patterns will be corrected.

The digital logic circuits convert invalid 1T and 2T channel bit lengths to valid 3T channel bit lengths while the channel bits are shifted through the shift register in the EFM demodulator circuit.

The alternate method and circuit is simpler to implement than the method and circuit of the preferred embodiment. However, the alternate method and circuit does not attempt to correct all possible invalid 14-channel bit patterns and does not base it's conversion of invalid patterns on a fuzzy logic comparison to valid 14-channel bit patterns. Therefore, the error correction performance of the alternate approach is inferior to the fuzzy logic-based look-up table described in the preferred embodiment.

The logic gates detect the occurrence of 1T pattern "0110" within the 14-channel bit symbol and convert the 1T pattern to a 3T "1001" pattern. The 2T pattern of "1010" is also converted to a 3T "1001" pattern by the digital logic gates.

OBJECTS OF THE INVENTION

It is therefore a principal object of the present invention to provide a circuit and method for EFM demodulation and which is capable of correcting data errors caused by invalid EFM bit patterns using a fuzzy logic-based ROM look-up table.

It is also an object of the present invention to improve the overall error correction capability by working in conjunction with the existing compact disc player error correction circuits without adding burden or incompatibility to the compact disc format. By improving the error correction capability of the error correction system, the resulting compact disc player will be more robust and fault tolerant.

It is another object of the present invention to allow the correction of errors caused by invalid EFM bit patterns to begin prior to the existing error correction circuits of the compact disc player and not add further delay (in comparison to traditional EFM demodulation).

It is still another object of the present invention to provide a method of EFM demodulation, which method can begin correcting errors caused by invalid EFM bit patterns before traditional error correction circuits that can be easily added to integrated circuit designs which currently include a traditional EFM demodulation stage.

BRIEF DESCRIPTION OF THE DRAWINGS

Additional features and advantages of the invention will be made apparent from the following detailed description of a preferred embodiment, which proceeds with reference to the accompanying drawings.

FIG. 4 shows the single bit compare tests:for invalid EFM patterns;

FIG. 5 shows the dual bit compare tests for invalid EFM patterns;

FIG. 6 shows the triple bit compare tests for invalid EFM patterns;

FIG. 7 shows the quad bit compare tests for invalid EFM patterns;

DETAILED DESCRIPTION OF THE PREFERRED EMBODIMENT

Figure 1:
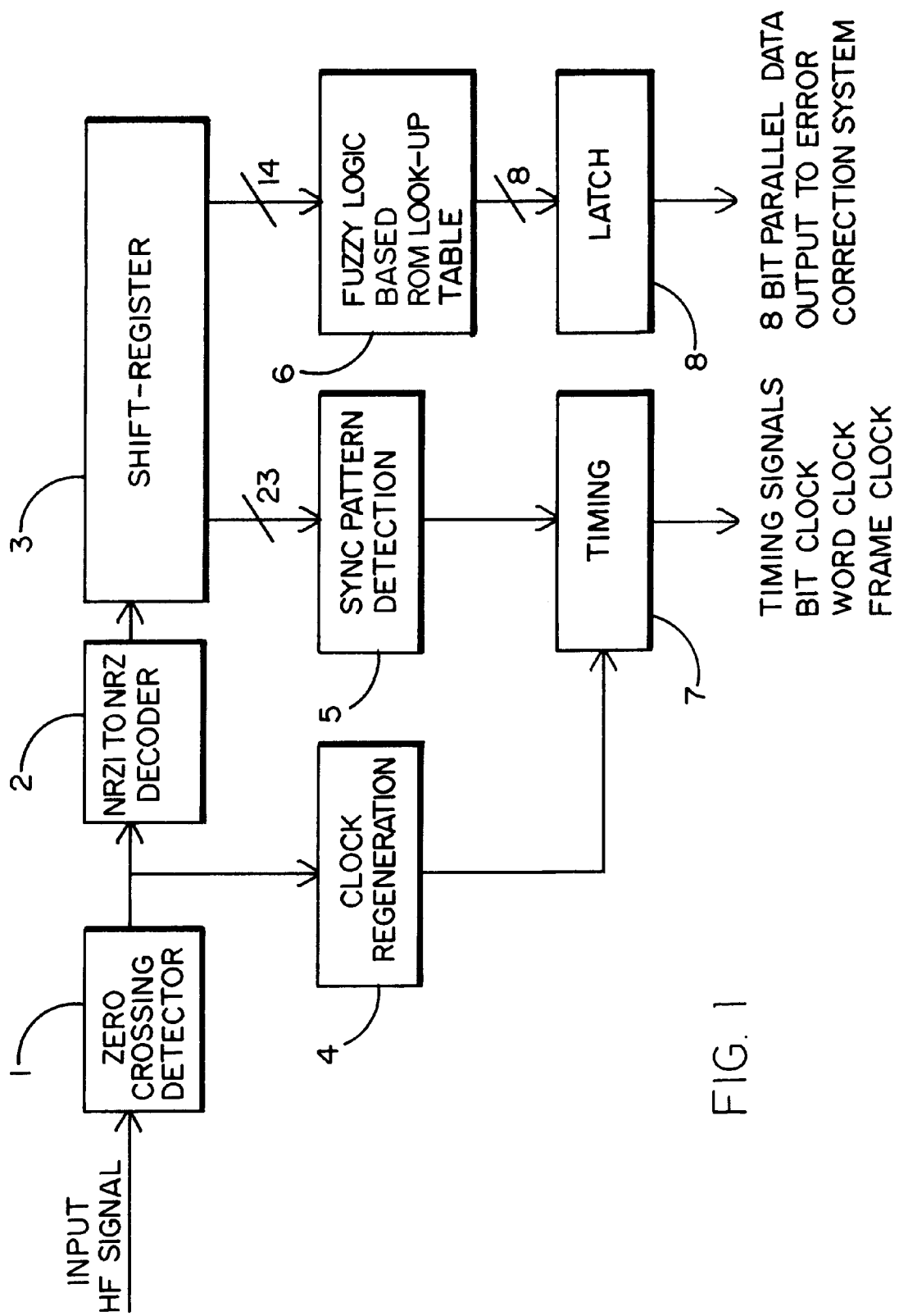
FIG. 1 is a block diagram of an EFM demodulator with fuzzy logic-based ROM look-up table.

With reference to FIG. 1, an EFM demodulation circuit according to the preferred embodiment of the invention is detailed with logic circuits simplified for clarity. The preferred embodiment of the invention comprises an EFM demodulation circuit which includes a unique ROM look-up table 6 expanded to contain the fuzzy logic-based conversion to 8-bit digital values of all invalid EFM 14-channel bit patterns.

The demodulation of an EFM 14-channel bit symbol begins as the zero crossing detector circuit 1 receives the high frequency (HF) signal from the compact disc. The HF signal is converted into a non-return to zero inverted (NRZI) encoded signal by the zero crossing detector circuit 1. The clock regeneration circuit 4 and NRZI to non-return to zero (NRZ) decoder 2 circuit receive the NRZI encoded signal output of the zero crossing detector circuit 1. The bit clock generated by the timing circuit 7 is used to clock NRZI encoded signal output of the zero crossing detector circuit 1 into the NRZI to NRZ decoder circuit 2. The NRZI to NRZ decoder circuit converts the NRZI encoded signal into a NRZ encoded signal. The shift register 3 receives the NRZ encoded signal output from NRZI to NRZ decoder circuit 2. The clock used for timing signals is regenerated by the clock regeneration circuit 4. The clock regeneration circuit 4 includes a phase locked loop (PLL) circuit locked to the channel bit frequency. The shift register 3 receives the NRZ signal output of the NRZI to NRZ decoder circuit 2 and is clocked by the bit clock generated by the timing circuit 7. The sync pattern detector 5 checks the parallel output of the shift register 3 for the specific sync pattern. The timing circuit 7 receives the output signal of the sync pattern detector circuit 5 when the sync pattern is detected. The detection of the sync pattern is used to synchronize the demodulation of EFM with the start of a 588-channel bit frame. The timing circuit 7 generates timing signals including the word clock.

Fourteen bits of the parallel output of the shift register 3 form the 14-bit address of the fuzzy logic-based ROM look-up table 6. When the 14 bit address is equal to a valid EFM 14-channel bit pattern, the fuzzy logic-based ROM look-up table circuit 6 converts the 14 bit address value into the 8-bit digital value as defined by the standard EFM conversion table. However, if the 14-bit address is not equal to a valid EFM 14-channel bit pattern, the fuzzy logic-based ROM look-up table will convert the invalid pattern into the most likely 8-bit digital value. The fuzzy logic-based ROM look-up table contains the most likely conversion of all invalid EFM 14-channel bit patterns. The fuzzy logic-based ROM look-up table conversion values are the result of a fuzzy logic comparison of the invalid EFM 14-channel bit patterns with all valid EFM 14-channel bit patterns. The 8-bit digital conversion value for an invalid EFM 14-channel bit pattern is equal to the 8-bit digital conversion value of the valid EFM 14-channel bit pattern that the invalid pattern was most similar to based upon the fuzzy logic comparison. If the invalid EFM 14-channel bit pattern is converted to the correct 8-bit digital value by the fuzzy logic-based ROM look-up table, an error is corrected by the invention method prior the traditional error correction circuits. The 8-bit digital parallel output of the fuzzy logic-based ROM look-up table circuit 6 is received by the 8-bit output latch circuit 8 which is clocked by the word clock. The EFM demodulation of a 14-channel bit symbol is complete when the error correction circuits of the compact disc player receive the 8-bit digital parallel output of the 8-bit latch circuit 8.

Figures 2, 3:
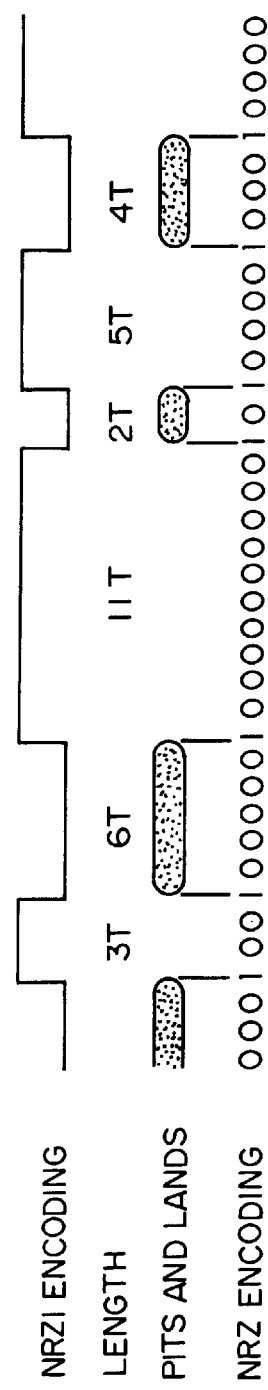
FIG. 2 is a standard EFM conversion table example.
FIG. 3 illustrates pits, lands, NRZI and NRZ encoding.

Referring to FIG. 2, an example of the standard EFM conversion table is shown. The table shows the first six EFM conversion values. The sample section of the table shows how the 14-channel bit patterns do not follow a sequential binary progression.

Referring to FIG. 3, the digital output of the zero crossing detector circuit is NRZI encoded. The pits of the compact disc relate to the negated state and the lands of the compact disc relate to the asserted state of NRZI encoded signal. Transitions in the bit stream are equal to the ones in NRZ encoding as shown in FIG. 3. The length of the pits and lands are often referred to by their channel bit length as 3T for 3 channel bits in length, 4T for 4 channel bits in length, et cetera. FIG. 3 shows an example of a 2T-pit length, which is invalid in EFM. The channel bit patterns chosen for EFM and defined in standard EFM conversion table do not allow pit or land lengths less than 3T long. A pit or land length of 2T however can and does occur and will cause an error if traditional EFM demodulation is used. The longest pit or land length allowed by EFM is an 11T and again a 12T can also occur and cause an error if traditional EFM demodulation is used on a compact disc player. The inventive method can correct errors caused by invalid pit and land lengths such as 2Ts and 12Ts which cause invalid EFM 14-channel bit patterns in EFM. Often an invalid EFM 14-channel bit pattern in EFM is off by a single channel clock period and the similarity to a valid EFM pattern is obvious.

The fuzzy logic-based look-up table contains conversions of all possible 14-channel bit patterns to 8-bit digital values. The conversion value for each 14-channel bit pattern was selected after a series of tests were run comparing the 14-channel bit pattern against all valid EFM 14-channel bit patterns. In accordance with the preferred embodiment of the invention the values selected by the results of the series. of tests are stored in a ROM look-up table. There is no limit to the number of tests which can be run to determine the similarity of invalid EFM 14-channel bit patterns to valid EFM 14-channel bit patterns. The tests, which compare the 14-channel bit pattern against all valid EFM patterns, can be implemented in software and run using a personal computer.

FIG. 4 through FIG. 7 detail a series of 14-channel bit invalid pattern to valid EFM 14-channel bit pattern comparison tests. Note: FIG. 4 through FIG. 7 use one of the 258 valid EFM 14-channel bit patterns and one of the 16,384 possible 14-channel bit patterns as the example data. It would be impractical in this document to review the 1 billion plus repetitive steps that would be required to determine the most likely 8-bit conversion value for all 16,384 locations of the fuzzy logic-based ROM look-up table.

FIG. 4 illustrates the single bit compare tests. Tests shown in FIG. 4 include a bit-for-bit compare test, equal number of transition test and longest run of bits that compare test. The bit-for-bit test compares the bit value for each bit in an invalid EFM 14-channel bit pattern against a valid EFM 14-channel bit pattern. The more bits of the two patterns that compare the more similar the two patterns must be and points are awarded accordingly. Bits that don't compare cause points to be subtracted by the bit-for-bit test. The transition test compares the number of ones in an invalid EFM 14-channel bit pattern with the number of ones in a valid EFM 14-channel bit pattern. When two patterns have the same number of transitions they are more similar than those that have an unequal number of transitions. The longest run length test counts the longest run of consecutive bits that compare between the bit positions of an invalid EFM 14-channel bit pattern and a valid EFM 14-channel bit pattern. A pattern with a long run length of bits that compare is more similar than a pattern that has a short run length of bits that compare.

FIG. 5 illustrates the dual bit sliding window compare tests, which include two bits equal in a row test, late transition test, early transition test and the run length of zeros before a late transition test. A sliding two-bit window is used to compare each two consecutive bits of an invalid EFM 14-channel bit pattern against the corresponding two bits of a valid EFM 14-channel bit pattern. Points are awarded for each two bits of an invalid EFM 14-channel bit pattern that compare with the corresponding two bits of a valid EFM 14-channel bit pattern. A pattern that has many consecutive two bits in a row that compare is more similar than a pattern that has fewer consecutive two bit patterns that compare. A "10" pattern of invalid EFM 14-channel bits and a "01" pattern of the corresponding valid EFM 14-channel bits is an indication of a late transition. A pattern that has a late transition is less. similar than a pattern that has a transition in the correct place but more similar than a pattern without a transition in the right place and without an early or late transition. A "01" pattern of invalid EFM 14-channel bits and a "10" pattern of the corresponding valid EFM 14-channel bits is an indication of an early transition. A pattern that has an early transition is less similar than a pattern that has a transition in the correct place but more similar than a pattern without a transition in the right place and: without an early or late transition. A final two bit test awards points based upon the run length of zeros before a late transition. A long run of zeros may contribute to a late transition due to the long run of zeros influencing the zero crossing detection circuit that is used to slice the wave signal into a digital signal. A pattern that has a long run of zeros before a late transition is awarded more points than a pattern with a short run of zeros before a late transition.

FIG. 6 illustrates the triple bit sliding window compare tests, which include three bits equal in a row test, a late transition test and an early transition test. A sliding 3-bit window is used to compare each three consecutive bits of an invalid EFM 14-channel bit pattern against the corresponding three bits of a valid EFM 14-channel bit pattern. Points are awarded for each three bits of an invalid EFM 14-channel pattern that compare with the corresponding three bits of a valid EFM 14-channel bit pattern. A pattern that has many consecutive three bits in a row that compare is more similar than a pattern that has fewer consecutive three bit patterns that compare. A "100" pattern of invalid EFM 14-channel bits and a "010" pattern of the corresponding valid EFM 14-channel bits is an indication of a late transition. A "010" pattern of invalid EFM 14-channel bits and a "001" pattern of the corresponding valid EFM 14-channel bits is also an indication of a late transition. A pattern that has a late transition is less similar than a pattern that has a transition in the correct place but more similar than a pattern without a transition in the right place and without an early or late transition. A "001" pattern of invalid EFM 14-channel bits and a "010" pattern of the corresponding valid EFM 14-channel bits is an indication of an early transition. A "010" pattern of invalid EFM 14-channel bits and a "100" pattern of the corresponding valid EFM 14-channel bits is also an indication of an early transition. A pattern that has an early transition is less similar than a pattern that has a transition in the correct place but more similar than a pattern without a transition in the right place and without an early or late transition.

FIG. 7 illustrates the quad bit sliding window compare tests, which include four bits equal in a row test, late transition at the edge of a four bit window test, early transition at the edge of a four bit window test, late transition in the center of a four bit window test, early transition in the center of a four bit window test and a 2T within a 3T in a four bit window test. A sliding four-bit window is used to compare each four consecutive bits of an invalid EFM 14-channel bit pattern against the corresponding four bits of a valid EFM 14-channel bit pattern. Points are awarded for each four bits of an invalid 14-channel bit pattern that compare with the corresponding four bits of a valid EFM 14-channel bit pattern. A pattern that has many consecutive four bits in a row that compare is more similar than a pattern that has fewer consecutive four bit patterns that compare. A "1000" pattern of invalid EFM 14-channel bits and a "0100" pattern of the corresponding valid EFM 14-channel bits is an indication of a late transition on the edge of a four bit window. A "0010" pattern of invalid EFM 14-channel bits and a "0001" pattern of the corresponding valid EFM 14-channel bits is also an indication of a late transition on an edge of a four bit window. A "0100" pattern of invalid EFM 14-channel bits and a "0010" pattern of the corresponding valid EFM 14-channel bits is an indication of a late transition in the center of a four bit window. A pattern that has a late transition is less similar than a pattern that has a transition in the correct place but more similar than a pattern without a transition in the right place and without an early or late transition. A "0100" pattern of invalid EFM 14-channel bits and a "1000" pattern of the corresponding valid EFM 14-channel bits is an indication of an early transition on the edge of a four bit window. A "0001" pattern of invalid EFM 14-channel bits and a "0010" pattern of the corresponding valid EFM 14-channel bits is an indication of an early transition on the edge of a four bit window. A "0010" pattern of invalid EFM 14-channel bits and a "0100" pattern of the corresponding valid EFM 14-channel bits is an indication of an early transition in the center of a four bit window. A pattern that has an early transition is less similar than a pattern that has a transition in the correct place but more similar than a pattern without a transition in the right place and without an early or late transition.

The final four-bit test checks for a 2T invalid EFM bit pattern within a 3T valid EFM bit pattern. A "0101" pattern of invalid EFM bits and a "1001" pattern of the corresponding valid EFM bits is an indication of a 2T within a 3T in a four bit window. A "1010" pattern of invalid EFM bits and a "1061" pattern of the corresponding valid EFM bits is also an indication of a 2T in a 3T within a four bit window. An invalid pattern that has 2T where a 3T should be, is off by a single channel bit and is considered similar.

As each test is run for an invalid EFM 14-channel bit pattern, points are awarded and are totaled and stored for each of the valid EFM patterns against which it is compared. When the tests have been run with an invalid EFM 14-channel bit pattern against all valid EFM patterns, the point totals for the valid EFM patterns are checked for the highest point total. The 8-bit digital value from the EFM conversion table for the valid EFM pattern that has the highest point total, is used as the conversion value for the tested 14-channel bit pattern. In the case when a point total tie occurs, the valid EFM pattern with lowest number of invalid EFM patterns assigned may be given the conversion assignment. The fuzzy logic-based ROM look-up table values are assigned when all 16,384 possible 14-channel bit patterns have been tested and the corresponding 8-bit digital conversion values have been determined. The 16,384 location ROM look-up table is programmed with the 8-bit digital conversion values that were determined and selected by the fuzzy logic comparison tests. Once the ROM is programmed it can be used to demodulate EFM in the EFM demodulation circuit as shown in FIG. 1.

Figure 8:
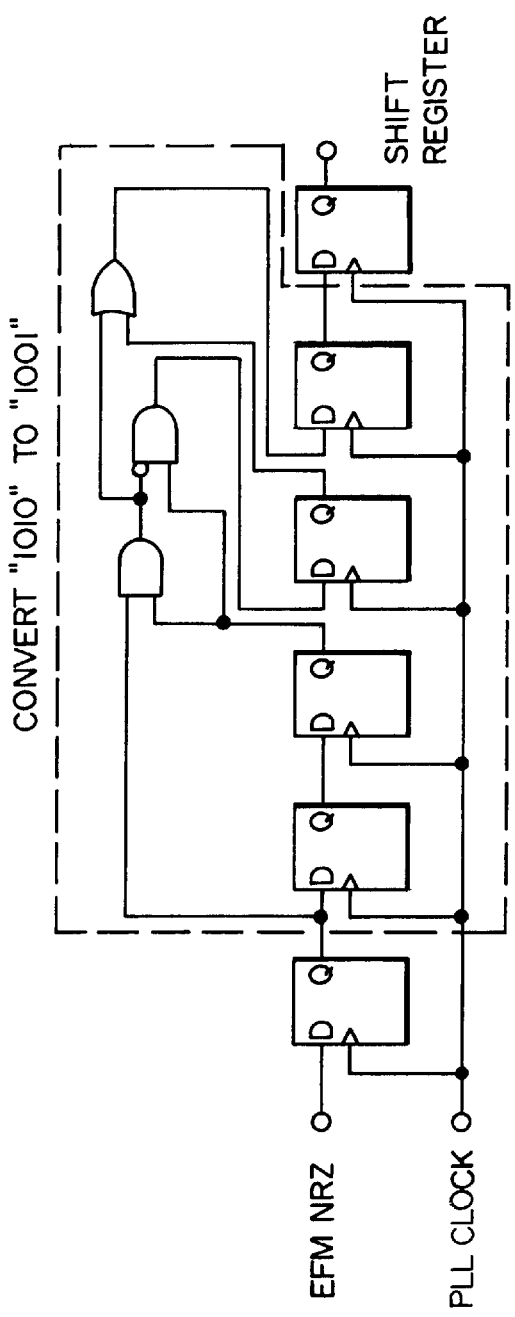
FIGS. 8 and 9 are schematics of digital logic circuits used in an alternative embodiment of the invention.
Figure 9:
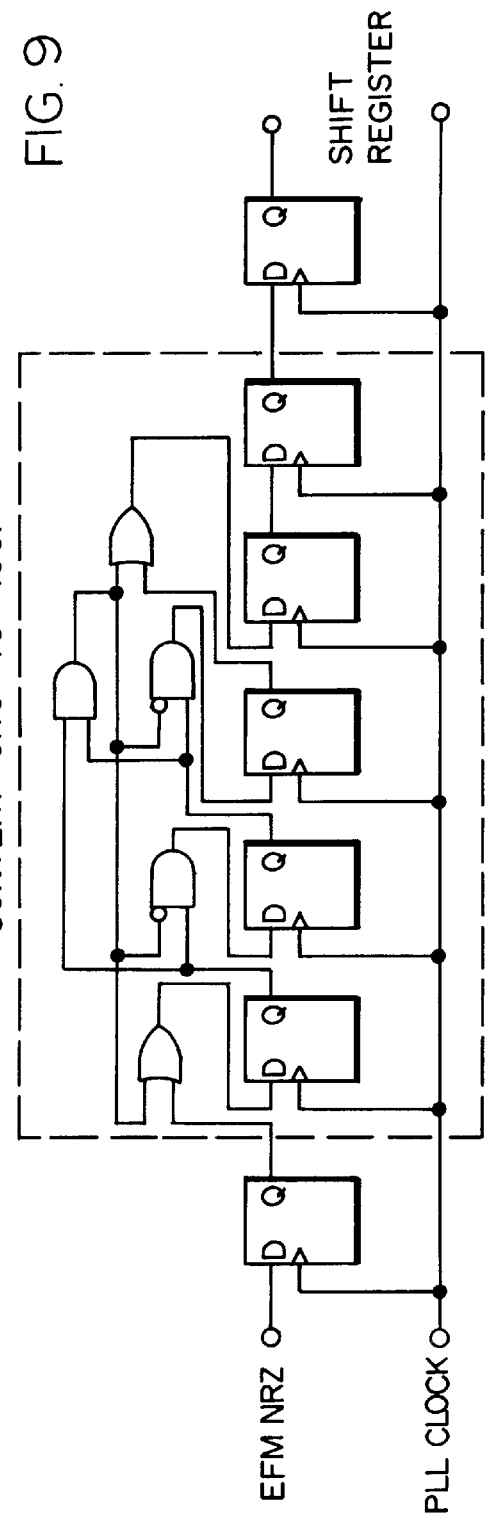
Figure 10:
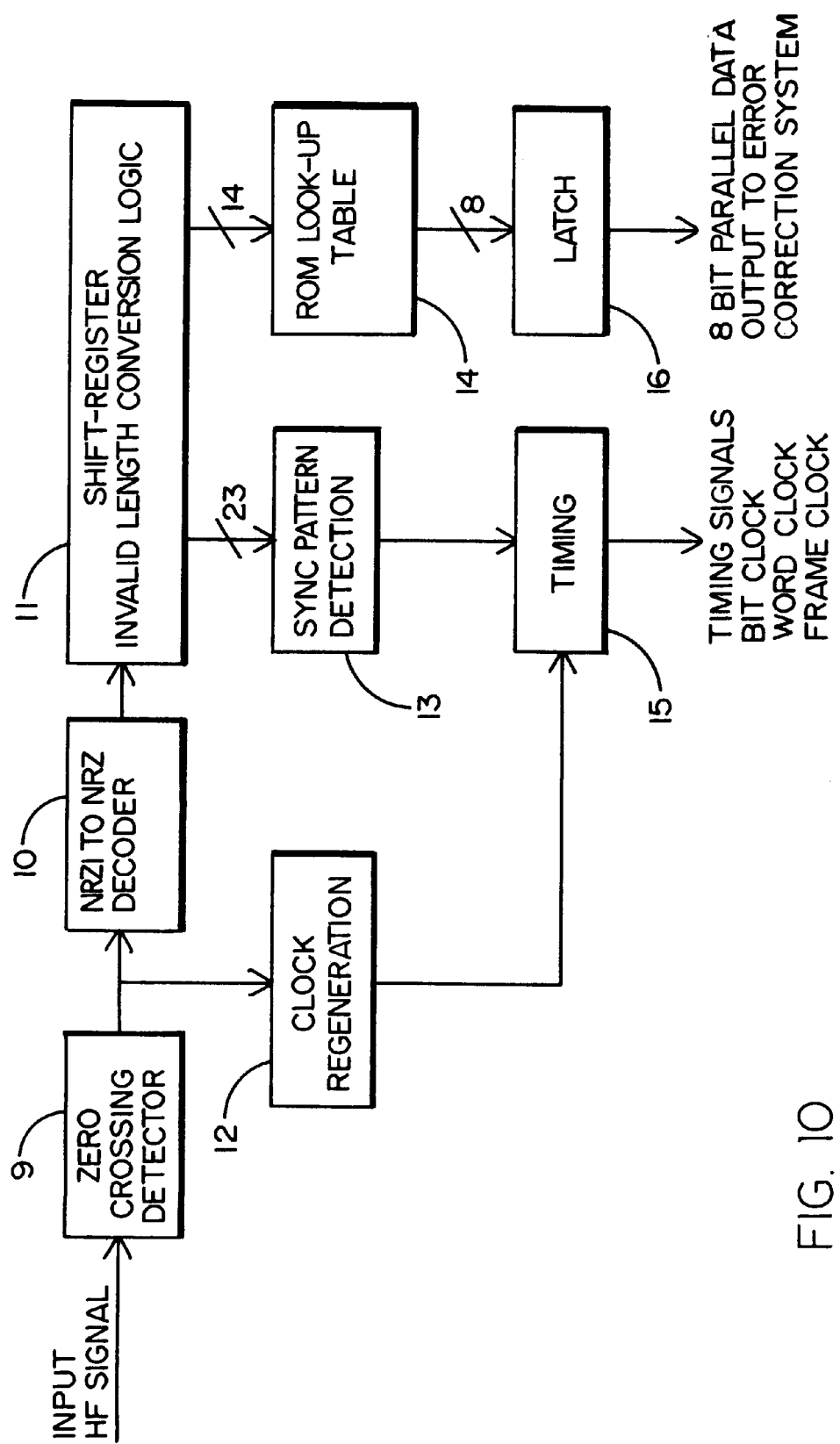
FIG. 10 is a block diagram of the EFM demodulator circuit of the alternative embodiment.

A method and circuit to correct errors caused by invalid EFM 14-channel bit patterns is implemented in an alternative embodiment by adding digital logic gates shown in FIG. 8 and FIG. 9 to the shift register stage of an EFM demodulator shown in FIG. 10. A percentage of errors caused by invalid 14-channel bit patterns can be corrected by converting invalid channel bit patterns detected as 1T and 2T channel bit lengths to valid 3T channel bit lengths using digital logic gates in conjunction with the shift register stage of the EFM demodulator.

This alternative method and circuit will convert some of the invalid 14-channel bit patterns to valid 14-channel bit patterns before the parallel output of the shift register is used as the address to a standard EFM conversion table. Therefore, some errors caused by invalid 14-channel bit patterns will be corrected.

The digital logic circuits FIG. 8 and FIG. 9 convert invalid 1T and 2T channel bit lengths to valid 3T channel bit lengths while the channel bits are shifted through the shift register in the EFM demodulator circuit FIG. 10.

This alternative method and circuit is simpler to implement than the method and circuit of the preferred embodiment. However, this embodiment does not attempt to correct all possible invalid 14-channel bit patterns and does not base it's conversion of invalid patterns on a fuzzy logic comparison to valid 14-channel bit patterns. Therefore, the error correction performance of this alternative approach is inferior to the fuzzy logic-based look-up table described in the preferred embodiment.

The logic gates in FIG. 9 detect the occurrence of a 1T pattern "0110" within the 14-channel bit symbol and convert the 1T pattern to a 3T "1001" pattern. The 2T pattern of "1010" is also converted to a 3T "1001" pattern by the digital logic gates in FIG. 8.

With reference to FIG. 10, an EFM demodulation circuit according to the alternative embodiment of the invention is detailed with logical circuits simplified for clarity. The alternate embodiment of the invention comprises an EFM demodulation circuit which includes a unique shift register stage 11 with added digital logic which converts invalid 1T and 2T channel bit lengths to valid 3T channel bit lengths.

The demodulation of an EFM 14-channel bit symbol begins as the zero crossing detector circuit 9 receives the high frequency (HF) signal from the compact disc. The HF signal is converted into a non-return to zero inverted (NRZI) encoded,signal by the zero crossing detector circuit 9. The clock regeneration circuit 12 and NRZI to non-return to zero (NRZ) decoder 10 circuit receive the NRZI encoded signal output of the zero crossing detector circuit 9. The bit clock generated by the timing circuit 15 is used to clock NRZI encoded signal output of the zero crossing detector circuit 9 into the NRZI to NRZ decoder circuit 10. The NRZI to NRZ decoder circuit converts the NRZI encoded signal into a NRZ encoded signal. The shift register 11 receives the NRZ encoded signal output from NRZI to NRZ decoder circuit 10. The clock used for timing signals is regenerated by the clock regeneration circuit 12. The clock regeneration circuit 12 includes a phase locked loop (PLL) circuit locked to the channel bit frequency. The shift register 11 receives the NRZ signal output of the NRZI to NRZ decoder circuit 10 and is clocked by the bit clock generated by the timing circuit 15. The sync pattern detector 13 checks the parallel output of the shift register 11 for the specific sync pattern. The timing circuit 15 receives the output signal of the sync pattern detector circuit 13 when the sync pattern is detected. The detection of the sync pattern is used to synchronize the demodulation of EFM with the start of a 588-channel bit frame. The timing circuit 15 generates timing signals including the word clock. Fourteen bits of the parallel output of the shift register 11 form the 14-bit address of the ROM look-up table 14. The ROM look-up table circuit 14 converts the 14-bit address value into the 8-bit digital value as defined by the standard EFM conversion table. If invalid pit and land lengths are converted to their intended lengths before the parallel output of the shift register is used as the address of the ROM look-up table, an error has been corrected by the invention prior to the traditional error correction circuits. The 8-bit digital parallel output of ROM look-up table circuit 14 is received by the 8-bit output latch circuit 16 which is clocked by the word clock. The EFM demodulation of a 14-channel bit symbol is complete when the error correction circuits of the compact disc player receive the 8-bit digital parallel output of the 8-bit latch circuit 16.

Based upon the foregoing, it should be apparent that the invention may be implemented in a number of alternative ways. For example, in storing demodulated words in the look-up table, one may either do that ahead of actual operation or in real time during actual operation, depending on time constraints. Moreover, one may store an 8-bit word for every 14-bit EFM word (valid and invalid) by duplicating 8-bit words for invalid 14-bit words based upon the 8-bit word for the most similar 14-bit valid EFM word. Alternatively, one may convert an invalid 14-bit word to a valid 14-bit word and then use the valid 14-bit word as the address.

Having thus disclosed a preferred embodiment and alternative embodiments of the method and circuit of the invention, it being understood that these embodiments are not exhaustive of possible variations but are merely exemplary of the inventor's creations.

What is claimed is:

1. An apparatus for demodulating a first form of digital information into a second form of digital information; the apparatus comprising:

a source of changing digital information expressed as a series of binary words of N bits each;

a look-up table memory device storing a plurality of M-bit words where M is less than N, a first plurality of said N-bit words corresponding one for one to said M-bit words and a second plurality of said N-bit words addressing M-bit words corresponding to the most similar N-bit word of said first plurality of N-bit words, said look-up table memory device receiving said first and second pluralities of N-bit words as addresses to said plurality of stored binary M-bit words; and a converter for converting each of said second plurality of N-bit words to a most similar one of said first plurality of N-bit words based upon a series of tests comparing respective bits, respective groups of bits and respective bit transitions of said first and second pluralities of N-bit words, each said second plurality of N-bit words being received by said memory device as an address for an M-bit word equal to the M-bit word corresponding to the selected most similar one of said first plurality of N-bit words resulting from said tests.

2. The apparatus recited in claim 1 wherein said converter comprises means for running a bit-by-bit compare test on a single bit-by-single bit basis.

3. The apparatus recited in claim 1 wherein said converter comprises means for running a number of bit transitions test on a single bit-by-bit basis.

4. The apparatus recited in claim 1 wherein said converter comprises means for running a longest run of bits that compare test on a single bit-by-bit basis.

5. The apparatus recited in claim 1 wherein said converter comprises means for running a number of two bits equal in a row in a sliding 2-bit window test.

6. The apparatus recited in claim 1 wherein said converter comprises means for running an early transitions test on a sliding 2-bit window basis.

7. The apparatus recited in claim 1 wherein said converter comprises means for running a late transitions test on a 2-bit sliding window basis.

8. The apparatus recited in claim 1 wherein said converter comprises means for running a run length of zeros before a late transition test.

9. The apparatus recited in claim 1 wherein said converter comprises means for running a number of three bits equal in a row in a sliding 3-bit window test.

10. The apparatus recited in claim 1 wherein said converter comprises means for running an early transitions test on a 3-bit sliding window basis.

11. The apparatus recited in claim 1 wherein said converter comprises means for running a late transitions test on a 3-bit sliding window basis.

12. The apparatus recited in claim 1 wherein said converter comprises means for running a number of four bits equal in a row in a 4-bit sliding window test.

13. The apparatus recited in claim 1 wherein said converter comprises means for running a late transitions at edge of a 4-bit sliding window test.

14. The apparatus recited in claim 1 wherein said converter comprises means for running an early transitions at edge of a 4-bit sliding window test.

15. The apparatus recited in claim 1 wherein said converter comprises means for running a late transitions in the center of a 4-bit sliding window test.

16. The apparatus recited in claim 1 wherein said converter comprises means for running an early transitions in the center of a 4-bit sliding window test.

17. The apparatus recited in claim 1 wherein said converter comprises means for selectively weighting each of said compare tests in relation to its respective correlation to accurate conversion of a word from said second plurality of N-bit words to a word from said first plurality of N-bit words.

18. The apparatus recited in claim 1 wherein said converter comprises fuzzy logic for carrying out said:series of tests.

19. The apparatus recited in claim 1 wherein said source comprises a disc having a series of light-reflective pits and lands in accordance with said series of N-bit binary words.

20. The apparatus recited in claim 19 wherein said disc is a digital compact disc.

21. The apparatus recited in claim 1 wherein each said word of said first plurality of N-bit words comprises a series of binary ones and zeros where each two closest binary ones are separated by at least two binary zeros and wherein said converter comprises means for comparing each group of adjacent four bits of each N-bit word of said second plurality of N-bit words with each corresponding group of adjacent four bits of each N-bit word of said first plurality of N-bit words and means for scoring as similar respective groups of adjacent four bits of said first and second pluralities of N-bit words where two closest binary ones of a group of said second plurality of N-bit words are separated by only one less binary zero than in a corresponding group of said first plurality of N-bit words.

22. A method for demodulating a first form of digital information into a second form of digital information; the method comprising the steps of:
   a) providing a source of changing digital information expressed as a series of binary words of N bits each;
   b) providing an addressable memory device receiving said N-bit words as addresses;
   c) storing in said memory device a plurality of binary M-bit words at locations corresponding to a first plurality of said N-bit words as valid addresses to such locations, where N>M;
   d) storing in said memory device additional copies of said M-bit words at addresses corresponding to N-bit words not in said first plurality of N-bit words and based upon an M-bit word at the N-bit address in said first plurality of N-bit words which is most similar to the N-bit word not in said first plurality of N-bit words;
   e) determining for each of the respective N-bit words from said source and not within said first plurality of N-bit words, a most similar N-bit word within said first plurality of N-bit words by conducting a series of comparison tests wherein each N-bit word not in said first plurality of N-bit words is compared with each N-bit word within said first plurality of N-bit words by comparing respective bits, respective groups of bits and respective bit transitions.

23. The method recited in claim 22 wherein said determining step comprises the step of running a bit-by-bit compare test on a single bit-by-single bit basis.

24. The method recited in claim 22 wherein said determining step comprises the step of running a number of bit transitions test on a single bit-by-bit basis.

25. The method recited in claim 22 wherein said determining step comprises the step of running a longest run of bits that compare test on a single bit-by-bit basis.

26. The method recited in claim 22 wherein said determining step comprises the step of running a number: of two bits equal in a row in a 2-bit sliding window test.

27. The method recited in claim 22 wherein said determining step comprises the step of running an early transitions test on a 2-bit sliding window basis.

28. The method recited in claim 22 wherein said determining step comprises the step of running a late transitions test on a 2-bit sliding window basis.

29. The method recited in claim 22 wherein said determining step comprises the step of running a run length of zeros before a late transition test.

30. The method recited in claim 22 wherein said determining step comprises the step of running a number of three bits equal in a row in a 3-bit sliding window test.

31. The method recited in claim 22 wherein said determining step comprises the step of running an early transitions test on a 3-bit sliding window basis.

32. The method recited in claim 22 wherein said determining step comprises the step of running a late transitions test on a 3-bit sliding window basis.

33. The method recited in claim 22 wherein said determining step comprises the step of running a number of four bits equal in a row in a 4-bit sliding window test.

34. The method recited in claim 22 wherein said determining step comprises the step of running a late transitions at edge of a 4-bit sliding window test.

35. The method recited in claim 22 wherein said determining step comprises the step of running an early transitions at edge of a 4-bit sliding window test.

36. The method recited in claim 22 wherein said determining step comprises the step of running a late transitions in the center of a 4-bit sliding window test.

37. The method recited in claim 22 wherein said determining step comprises the step of running an early transitions in the center of a 4-bit sliding window test.

38. The method recited in claim 22 wherein said determining step comprises the step of selectively weighting each of said comparison tests in relation to its respective correlation to accurate conversion of a word not within said first plurality of N-bit words to a word within said first plurality of N-bit words.

39. The method recited in claim 22 wherein said determining step comprises the step of employing fuzzy logic to carry out said comparison tests.

40. The method recited in claim 22 wherein each said word of said first plurality of N-bit words comprises a series of binary ones and zeros where each two closest binary ones are separated by at least two binary zeros and wherein said determining step comprises the step of:
   comparing each group of adjacent four bits of each N-bit word not in said first plurality of N-bit words with each corresponding group of adjacent four bits of each N-bit word in said first plurality of N-bit words and scoring as similar respective groups of adjacent four bits of said N-bit words not in said first plurality of N-bit words with those in said plurality of N-bit words where two closest binary ones of a group of said N-bit words not in said plurality of N-bit words are separated by only one less binary zero than in a corresponding group of said first plurality of N-bit words.

41. An apparatus for demodulating a first form of digital information into a second form of digital information; the apparatus comprising:

a source of changing digital information expressed as a series of binary words of N bits each;

a look-up table memory device storing a plurality of M-bit words where M is less than N, a first plurality of said N-bit words corresponding one for one to said M-bit words and a second plurality of said N-bit words having no corresponding M-bit words, said look-up table memory device receiving said first plurality of N-bit words as addresses to said plurality of stored binary M-bit words;

wherein each said word of said first plurality of N-bit words comprises a series of binary ones and zeros where each two closest binary ones are separated by at least two binary zeros;

a converter for converting each said N-bit word of said second plurality of N-bit words having two closest binary ones separated by less than two binary zeros to an N-bit word having no two binary ones separated by less than two binary zeros; and means for applying said converted N-bit words of said second plurality of N-bit words to said memory device as addresses.

42. An apparatus for demodulating a first form of digital information into a second form of digital information; the apparatus comprising:

a source of changing digital information expressed as a series of binary words of N bits each;

a look-up table memory device storing a plurality of M-bit words where M is less than N, a first plurality of said N-bit words corresponding one for one to said M-bit words and a second plurality of said N-bit words having no corresponding M-bit words, said look-up table memory device receiving said first plurality of N-bit words as addresses to said plurality of stored binary M-bit words; and a converter for converting each of said second plurality of N-bit words to a most similar one of said first plurality of N-bit words based upon a series of tests comparing respective bits, respective groups of bits and respective bit transitions of said first and second pluralities of N-bit words, each said second plurality of N-bit words being received by said memory device as an address equal to the selected most similar one of said first plurality of N-bit words resulting from said tests, for generating a corresponding M-bit word.

43. A method for demodulating a first form of digital information into a second form of digital information; the method comprising the steps of:

a) providing a source of changing digital information expressed as a series of binary words of N bits each;

b) providing an addressable memory device receiving said N-bit words as addresses;

c) storing in said memory device a plurality of binary M-bit words at locations corresponding to a first plurality of said N-bit words as valid addresses to such locations, where N>M;

d) converting the respective N-bit words from said source and not within said first plurality of N-bit words to a most similar N-bit word within said first plurality of N-bit words by conducting a series of comparison tests wherein each N-bit word not in said first plurality of N:bit words is compared with each N-bit word within said first plurality of N-bit words by comparing respective bits, respective groups of bits and respective bit transitions; and e) treating each N-bit word not, in said first plurality of N-bit words as an address to said memory device corresponding to the most similar of said first plurality of N-bit words based upon said series of comparison tests.

* * * * *

UNITED STATES PATENT AND TRADEMARK OFFICE
CERTIFICATE OF CORRECTION

PATENT NO. : 6,483,882 B1
DATED : November 19, 2002
INVENTOR(S) : James Orrin O'Dea Page 1 of 1

It is certified that error appears in the above-identified patent and that said Letters Patent is hereby corrected as shown below:

Column 1,
Line 11, "alconversion" should read -- a conversion --.

Column 2,
Line 9, "system:carries" should read -- system carries --.

Column 4,
Line 21, "tests:for" should read -- tests for --.

Column 6,
Line 3, "series." should read -- series --.
Line 63, "and:" should read -- and --.

Column 8,
Line 13, "1061" should read -- 1001 --.

Column 11,
Line 14, "said:series" should read -- said series --.

Column 14,
Line 28, "N:bit" should read -- N bit --.

Signed and Sealed this

Fifteenth Day of July, 2003

JAMES E. ROGAN
*Director of the United States Patent and Trademark Office*